Aug. 9, 1949. W. R. HICKLER 2,478,267
COMPOSITE PRODUCTS AND METHODS OF MAKING THE SAME
Filed March 11, 1944 2 Sheets—Sheet 2
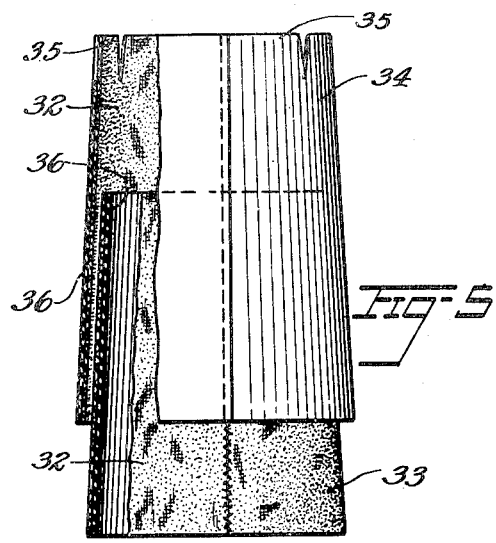
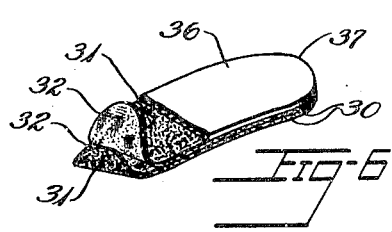
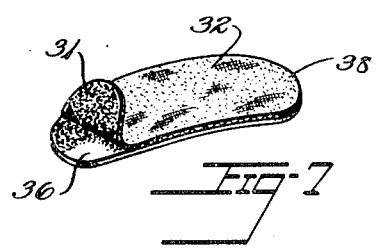
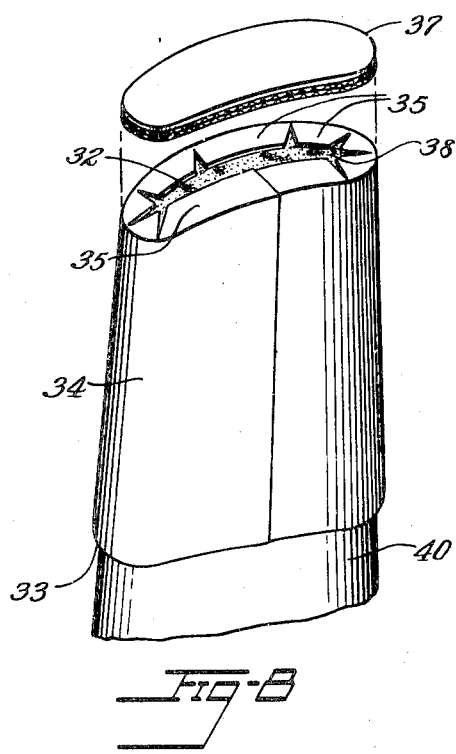
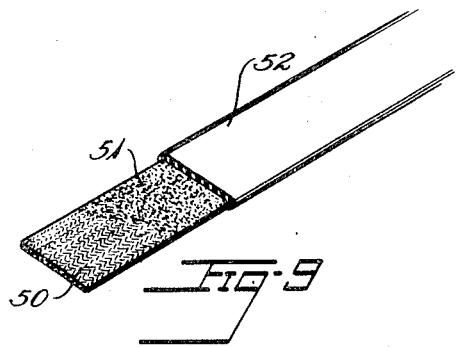
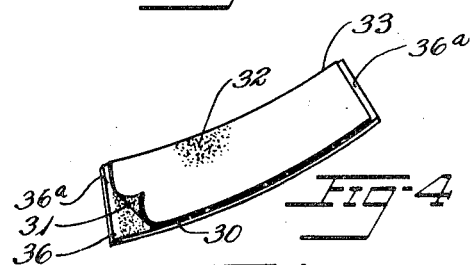
Inventor
Walter R. Hickler
By Willis T. Avery
Atty.

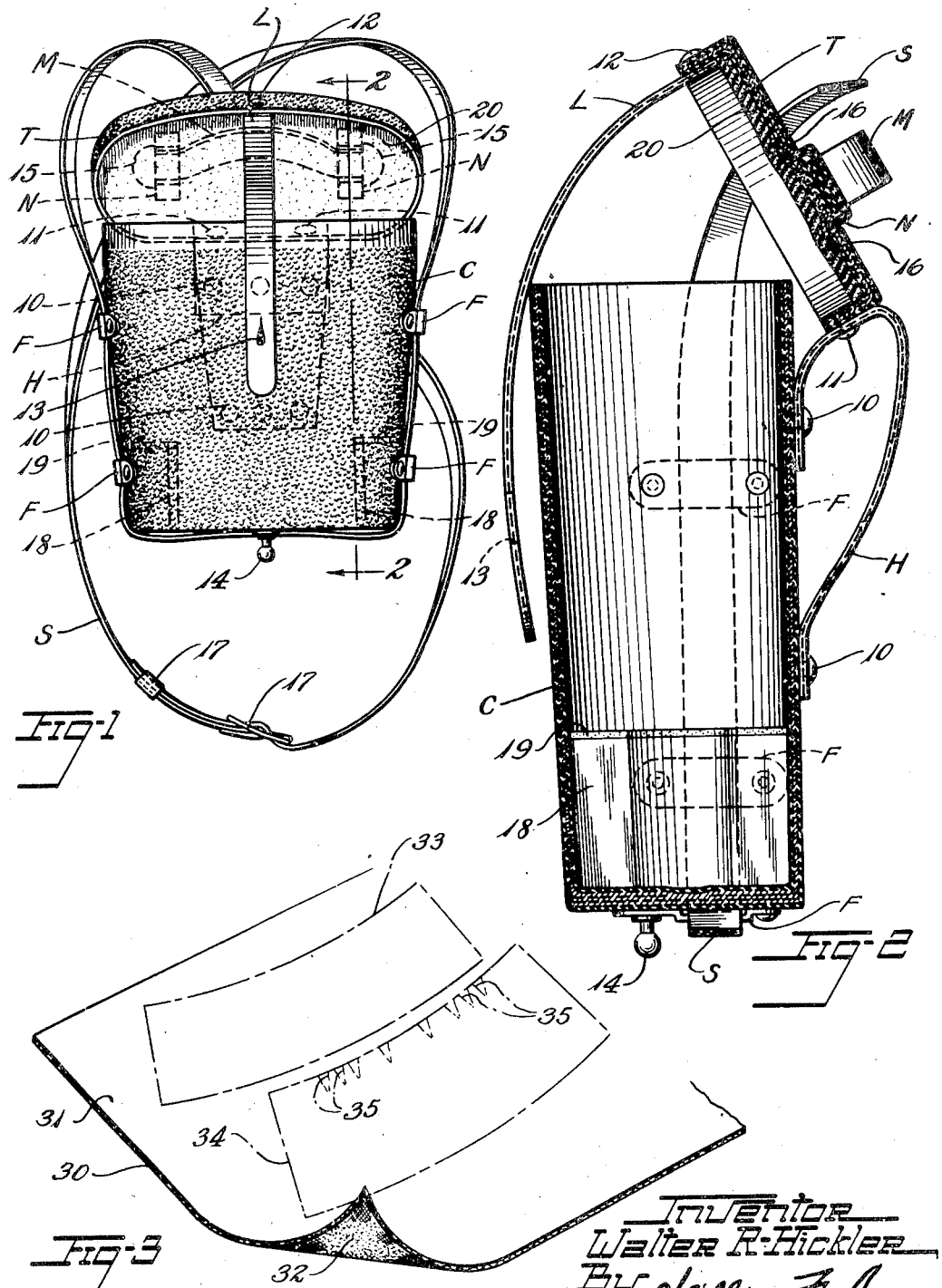

Patented Aug. 9, 1949

2,478,267

UNITED STATES PATENT OFFICE 2,478,267

COMPOSITE PRODUCTS AND METHODS OF MAKING THE SAME

Walter R. Hickler, Winthrop, Mass., assignor to
The B. F. Goodrich Company, New York, N. Y.,
a corporation of New York Application March 11, 1944, Serial No. 526,106

12 Claims. (Cl. 154—83)

This invention relates to composite products and to methods of making the same and is especially concerned with the manufacture of a composite material exhibiting leather-like characteristics of flexibility, strength and surface feel and appearance while surpassing natural leather in other important respects. More particularly, the invention is concerned with the manufacture of articles such as carrying cases for optical instruments, cameras, and the like, holsters, scabbards, luggage of various types, and, in general, products which heretofore have been made from natural leathers. The invention has outstanding value in the manufacture of products destined for rugged service requiring the toughness and strength characteristics of leather coupled with a similar degree of flexibility and ability to withstand mechanical shock but also demanding greater resistance to water absorption, abrasion, fungus growth, and general weathering than is exhibited by natural leather.

In the interest of simplicity, a preferred embodiment of the invention will be described in connection with the manufacture of a binocular carrying case of the type utilized by our armed forces, such description serving to illustrate both the product and the process aspects of the invention. It should be understood, however, that the invention is not limited to the manufacture of products destined for any particular end-use nor to specific details of structure and procedure which may be described unless the contrary is specifically indicated.

The exemplary manufacture of a carrying case for binoculars will be described with reference to the accompanying drawings, of which Fig. 1 is a front elevation showing the finished case with the top cover partially opened;

Fig. 2 is a vertical section taken on line 2—2 of Fig. 1;

Fig. 3 is a fragmentary perspective view illustrating early steps in preparing the composite material embodied in the case of Figs. 1 and 2;

Fig. 4 is a perspective view showing the composite material in a subsequent stage of preparation;

Fig. 5 is an elevational view showing a pair of cuff-like elements formed from the material of Figs. 3 and 4 being telescoped together, portions of both elements being broken away and sectioned for clarity of illustration;

Fig. 6 is a perspective view showing an outer closure member later to be associated with an end of the cuff-like assembly of Fig. 5, various plies of the closure member being shown broken away or stripped back for purposes of illustration;

Fig. 7 is a similar view showing an inner end-closure member;

Fig. 8 is a perspective view illustrating a preferred manner of assembling the cuff-like elements and two end-closure members preliminary to molding the composite assembly;

Fig. 9 is a perspective view partially broken away and sectioned and showing a typical strap member for the binocular case.

The typical binocular carrying case illustrated in Figs. 1 and 2 comprises, of immediate interest here, a one-piece container proper indicated by the letter C; a lid-like top cover T mounted on the container by means of a hinging strap H; a locking strap L for holding the cover tightly closed; a handle strap M adapted to be grasped in the hand and being secured to the cover T by a pair of strap loops N, N; and a shoulder strap S held in place about the container C by means of several fastening straps F, F.

The ends of the hinging strap H are riveted to the container C as indicated at 10, 10, while the depending rear lip of the top cover T is riveted to the hinging strap at 11, 11. One end of the locking strap L is riveted to a central portion of the depending front lip of the cover T as at 12, while the free end of the strap is provided with a notched opening 13 adapted to be pressed over the ball end of a locking pin 14 which projects from the bottom of the container and is held firmly in place by a machine screw (not shown) extending through the bottom wall of the container into threaded engagement with the pin 14.

The handle strap M is provided with shouldered ends as indicated at 15, 15 for engaging the strap loops N, N. The ends of the loops N, N pass through appropriate slots in the cover T and are cemented, riveted or otherwise secured to the inside face of the cover as shown more particularly in Fig. 2 at 16, 16.

The several fastening straps F, F are riveted to the container C, as shown, so that the case and its contents may be suspended by the shoulder strap S which passes under the fastening straps. The shoulder strap S is provided with conventional buckles, stay-loops, and the like, indicated by the numerals 17, 17.

The usual corner supporting blocks 18, 18 are provided in the bottom of the container at either side thereof and pads of cushioning material 19, 19 such as spongy rubber (natural or synthetic) or the like preferably should be cemented to the top face of each block.

For protecting the binocular lens and also providing a tight seal when the cover lid is closed, a pad of spongy rubber (natural or synthetic) or similar material may be cemented to the inside face of the top cover T as shown at 20.

A preferred mode of preparing the various parts of the case will now be described.

To prepare the container C, I preferably utilize fibrous sheet material as a base, a fairly heavy woven textile fabric such as cotton duck weighing about 18 oz. per square yard being preferred for making a rugged leather-like product for use in binocular carrying cases although other types of fibrous sheet material may be used in other instances.

As illustrated in Fig. 3 a sheet of such fabric 30 first is coated on one face only with an aqueous dispersion of a flexible elastomeric material, care being exercised to leave the opposite face of the fabric and a substantial portion of the adjacent thickness entirely free of the elastomeric material. Two coats of the dispersion preferably are applied and dried to produce a coating as indicated by the numeral 31.

The commercially available vinyl resin latices are especially suitable for this purpose. They are understood to comprise an aqueous dispersion of an elastoplastic consisting of a thermoplastic copolymer resin made by polymerizing a mixture of about 80 parts vinyl chloride and about 20 parts methyl acrylate which, in the dispersion, is admixed with a plasticizer such as triethylene glycol dicaprate in a quantity of the order of 40% of the weight of the copolymer present, the plasticizer being added in the form of an emulsion in accordance with the usual practice.

The dispersion should have a high viscosity and it should be carefully spread, brushed, sprayed, or otherwise applied to the fabric without forcing it to strike more than part way through in order that the opposite face of the fabric may be free of such resin, the resulting dried coating 31 being confined substantially to one face of the fabric. With proper care the coatings will penetrate no more than .005" to .010" into the yarn although some "rivets" of the coating material may extend deeper into the interstices between the yarns, especially after molding.

The reverse face of the fabric 30 then is treated by brushing, spraying or spreading with two coats of a thermosetting plastic in liquid form, such as an alcohol or acetone solution of phenol-formaldehyde resin, to produce a thermosetting plastic deposit 32 over the entire reverse face.

At this stage, the treated fabric preferably should be heated somewhat to advance the polymerization of the thermosetting plastic sufficiently to reduce its flow for facilitating further handling but not enough to set the plastic firmly.

I then cut from the prepared sheet of composite material two similarly shaped elements 33 and 34 of slightly arcuate outline as indicated by the dotted lines in Fig. 3, one of the elements 34 being notched along its inner circumference as shown to provide a series of flaps 35, 35 adapted to be folded inward for the purpose later described.

Next, a sheet of a solid elastomer such as a preformed calendered sheet 36 (Fig. 4) of plasticized polyvinyl chloride about 0.025" thick is juxtaposed against the initial coatings 31 of elastomer and cemented in place on each of the elements 33 and 34 (the preparation of the element 33 only being shown in Fig. 4). Usually, a narrow strip along each end of both elements should be left uncemented to permit stitching of the fabric ends together, as hereinafter described, without stitching the elastomer sheet. If desired, the added thickness of elastomer may be calendered or otherwise applied directly on the coated fabric. The elastomer sheet 36 preferably should be slightly longer than the fabric element to which it is applied so that a short portion of the elastomer sheet may project beyond either end of the fabric as shown at 36a, 36a. A suitable elastomer composition comprises 65 lbs. polyvinyl chloride, 20 lbs. triethylene glycol dicaprate, 12 lbs. dibutoxy ethyl phthalate together with a small amount of stabilizer such as about 3 lbs. (about 5% on the polyvinyl chloride) of basic lead carbonate or other stabilizer in an equivalent quantity and, if desired, 1 lb. carbon black or other pigment to impart a desired color to the composition.

Each of the two composite elements 33 and 34 then is doubled on itself and the respective ends are brought together in abutting relation and the fabric is cross-stitched, cemented or otherwise secured together, with the projections 36a, 36a, overlapping the stitched joint, to provide two separate but similarly-shaped cuff-like or frusto-conical elements indicated in Fig. 5 by the same numerals 33 and 34. The element 33 should be doubled so as to place the thermosetting plastic coated face 32 on the outside and the elastomer coated face 36 on the inside, while the other element 34 should be doubled in the reverse manner so as to place the thermosetting plastic coated face on the inside and the elastomer coated face on the outside.

The two elements 33 and 34 then are telescoped together as shown in Figs. 5 and 8 to provide a cuff-like assembly, the thermosetting plastic coated faces of the two elements being brought into juxtaposition while the elastomer coated faces are exposed one on the inside and one on the outside of the assembly. Desirably, the joints in the two elements may be offset somewhat with respect to each other to avoid undue bulkiness. The flaps 35, 35 then may be folded inward across the smaller open end of the assembly as the first step in forming the bottom wall of the container. It will be appreciated that the inside faces of the flaps 35 are coated with thermosetting plastic and the outside faces with elastomer.

The assembly also may be prepared in other manners as by juxtaposing the two elements 33 and 34 in the flat in proper relationship, then doubling both at once into cuff-like telescoped relation, and finally completing the joint.

I next prepare two kidney-shaped end closure members 37 and 38 as shown in Figs. 6 and 7, utilizing the same materials as in preparing the cuff-like elements, cutting out the requisite kidney-shaped elements having substantially the outline of the bottom of the binocular carrying case, and plying them up in the manner hereinafter indicated.

To prepare the outer closure member 37 (Fig. 6) cotton duck 30 is coated on one face with solids deposited directly from an aqueous dispersion of an elastomer 31, as described, and on the other face with a liquid thermosetting plastic composition 32 in the manner previously described. Two plies of the so treated fabric are superposed with the thermosetting plastic coated faces together after which a calendered sheet of elastomer such as plasticized polyvinyl chloride 36, previously described, is cemented to one of the exposed faces 31 coated with the dispersion solids of elastomeric material.

The inner end closure member 38 (Fig. 7) comprises a single ply of cotton duck 30 treated on one face 31 with solids deposited directly from an aqueous dispersion of an elastomeric material as described, and on the other face 32 with a thermosetting plastic as described. A calendered sheet of elastomer, such as plasticized polyvinyl chloride 36 as described, then is cemented to the elastomer coated face 31.

To assemble the parts for molding, the inner end closure member 38 is placed on the top end of a building form 40 (Fig. 8) with the thermosetting plastic coated face 32 exposed upwardly. The previously prepared cuff-like assembly of the two members 33 and 34 then is placed over the building form and the flaps 35 are folded over to bring together the thermosetting plastic coated faces of the flaps and the inner closure member. The outer closure member 37 then is positioned over the folded flaps as shown in Fig. 8 with the elastomer coated face 31 contiguous to the elastomer coated outer faces of the flaps and with the thicker layer of elastomer 36 exposed. The outer member 37 may be lightly cemented to hold it in place while the assembly is being transferred to a mold or, if desired, the outer member 37 may first be placed in the bottom of the mold in proper relation with the face 31 upward and the rest of the assembly then placed in position on top of it in the mold.

In either event, the composite assembly is positioned in a suitable container-shaped female mold member and a male pressure bag member is placed inside the assembly. The molding surface desirably may have a suitably engraved or smooth surface simulating any desired natural leather finish. The mold is closed and the composite assembly is consolidated by applying heat and pressure sufficient to integrate the structure, mold the thermoplastic elastomer and set the thermosetting plastic. In a typical case, a molding period of 8 to 10 minutes at a temperature of about 340° F. and bag pressure of about 400 to 500 p. s. i. may be used. The mold then is cooled to room temperature and the finished container C removed and trimmed.

It will be appreciated that the container C will exhibit a one-piece unitary integral structure, the fabric elements in the bottom being interlocked with the flaps extending from the sidewall and both the thermosetting plastic and the elastomeric portions of each being seamlessly blended with contiguous similar portions of the other. It will further be appreciated that both the sidewall and bottom wall of the container embody the following materials in the sequence recited: elastomer, fabric, thermosetting plastic, fabric, elastomer. As a consequence, a continuous unbroken outer surface of soft flexible, leather-like elastomeric material covers the entire exposed surface of the container both inside and out, while a core section of strength and rigidity imparting thermosetting plastic extends throughout the central section of the wall structure, the core of thermosetting plastic and the coatings of elastomeric material each being mechanically interlocked with the intervening layers of fabric which further serve to impart strength and toughness to the assembly.

The top cover T is molded to shape from a single piece of the composite sheet shown in Fig. 4 and described above, and it exhibits the same structure and properties as the container C. If desired, one or more additional plies of fabric treated on both faces with thermosetting plastic may be inserted between the thermosetting plastic treated faces 32, 32 of the assembly prior to molding in order to increase the rigidity and strength of the product. In a like manner, extra plies of elastomer treated fabric may be inserted between elastomer coated surfaces of the assembly.

The preparation of the various strap elements is typically illustrated in Fig. 9. All the strap elements embody a suitable textile fabric or other fibrous base 50 which is impregnated with an aqueous dispersion of an elastomeric composition such as the latices above described, the deposit of this material being indicated by the numeral 51. The so-treated fabric then is coated with solid flexible elastomeric material such as plasticized polyvinyl chloride 52. A suitable composition for this purpose comprises 65 lbs. polyvinyl chloride, about 18 lbs. dioctyl phthalate plasticizer and about 26 lbs. triethylene glycol dicaprate plasticizer, a small quantity of stabilizer such as about 3 lbs. (about 5% on the polyvinyl chloride) of basic lead carbonate, or the like, and carbon black or other coloring pigment as desired, for example, about 5 lbs. The assembly then is molded in appropriate strap or loop form which causes the outer layer of elastomer 52 to envelop the structure completely.

For the shoulder strap S, the locking strap L, and the handle M, the fabric base 50 may be a cotton braid or tape. For the heavier straps such as the hinge strap H, the fastening loops F, and the handle loops N, three plies of cotton duck should be used, each impregnated with aqueous dispersion and the assembly then coated with elastomeric material as described.

The container C and top cover T exhibit to a remarkable degree the necessary combination of strength and limited rigidity coupled with sufficient flexibility to yield under shock such as is found in heavy high grade natural leathers normally used in making binocular carrying cases. At the same time the strength of leather is equalled or exceeded and its appearance and feel characteristics are simulated with great fidelity.

The strap elements are more flexible than the container wall and are fully equal to conventional leather straps in this respect while still providing exceptional strength and dependability.

All the elements excel the best natural leather as respects resistance to water absorption, abrasion, fungus growth, warping and general weathering.

No other material known to applicant, whether natural or artificial, exhibits a similar combination of desirable properties.

In the interest of clarity, the invention has been described with reference to a preferred embodiment utilizing preferred materials and procedures. It should be understood, however, that other equivalent materials and procedures may be substituted therefor by a skilled artisan without departing from the true spirit and scope of the invention. Thus, any of the analogous thermosetting plastics may be substituted for the specific phenol-aldehyde material mentioned. Similarly, the preferred plasticized polyvinyl chloride composition may be replaced by similar elastomeric materials having essentially corresponding properties of strength, flexibility, surface feel and resistance to water and weather in general. The composition should preferably retain its flexibility at low temperatures as does the preferred material disclosed. Also the preferred latices may be replaced by aqueous dispersions of analogous vinyl resins or other suitable elastomeric materials. It is even possible to utilize a solvent solution of such materials in place of aqueous dispersions but such substitution usually involves a number of practical difficulties and is not to be preferred. Many but not all, equivalent elastomers and thermosetting plastics have been listed by Fisher in his article appearing in Industrial and Engineering Chemistry, volume 31, at page 941 (1939). The elastoprenes and elastoplastics generally will be preferred for use as the elastomeric material, the class of elastoplastics comprising the plasticized polymers of vinyl compounds prepared by polymerizing material consisting predominantly of vinyl chloride, either alone or in admixture with minor proportions of other monomers, being outstanding for this purpose. Various fibrous materials will be found appropriate in different applications, including both woven and unwoven fibrous structures, and numerous other variations and modifications in details of the procedure and materials described may be effected without departing from the spirit and scope of the invention as defined in the appended claims.

I claim:

1. In the manufacture of a composite product, the process which comprises preparing two cuff-like elements each comprising a fabric base member treated on one face with an elastomer and on the other face with a thermosetting plastic, assembling the two elements to form a tubular cuff-like assembly with the said elements in telescoped relation having their thermosetting plastic treated faces in opposition with the marginal portion of the outer element projecting beyond the inner element at one end thereof, folding said marginal portion across the open end of said assembly, associating with said marginal portion an end closure member comprising fabric treated on the face adjacent said marginal portion with a material of the same character as that on the adjacent face of said marginal portion, and consolidating the assembly by molding it under heat and pressure.

2. In the manufacture of a composite product, the process which comprises preparing a tubular element comprising a fabric base member interiorly treated with an elastomer and exteriorly treated with a thermosetting plastic, preparing a second tubular element comprising a fabric base member interiorly treated with a thermosetting plastic and exteriorly treated with an elastomer, assembling the two tubular elements with their thermosetting plastic treated surfaces in opposition and with the marginal portion of the outer element extending beyond the margin of the inner element at one end of said assembly, folding said marginal portion across the open end of said assembly, associating with said marginal portion supplemental fabric-base closure members on either side of said folded-back marginal portion in face-to-face relation therewith, the faces of said supplemental members adjacent the marginal portion each being treated with a material of the same character as that on the adjacent face of said marginal portion, and consolidating the assembly by molding it under heat and pressure.

3. In the manufacture of a composite product, the process which comprises preparing a cuff-like tubular element comprising a fabric base member interiorly treated with an elastomer and exteriorly treated with a thermosetting plastic, preparing a second cuff-like tubular element comprising a fabric base member interiorly treated with a thermosetting plastic and exteriorly treated with an elastomer, telescoping the two cuff-like elements with their thermosetting plastic treated surfaces together and with a marginal portion of the outer element extending beyond the margin of the inner element and being folded to extend across the open end of said assembly, associating with said marginal portion supplemental fabric-base closure members on either side of said folded-back marginal portion in face-to-face relation therewith, the faces of said supplemental members adjacent the marginal portion each being treated with a material of the same character as that on the adjacent face of said marginal portion and the outer face of the outer supplemental member being treated with a material of the same character as that on the outer face of the outer tubular element, and consolidating the assembly by molding it under heat and pressure.

4. In the manufacture of a composite product, the process which comprises preparing at least two elements each comprising a fabric member treated on one face with an elastomer and on the other face with a thermosetting plastic, at least one of said elements having a projecting flap portion at an end thereof, assembling the elements in superposed relation to provide a tubular assembly with the thermosetting plastic coated faces in opposition and with said flap portion extending across an open end of the assembly, associating with the thermosetting plastic coated face of the flap a closure member covering the said open end of the tubular assembly and comprising a fabric member treated with a thermosetting plastic on the face adjacent said flap and with an elastomer on the other face, associating with the elastomer treated face of said flap a closure member also covering the open end of the tubular assembly and comprising the following materials in the sequence recited: elastomer, fabric, thermosetting plastic, fabric, elastomer; and then consolidating the composite assembly by molding it under heat and pressure.

5. In the manufacture of a composite product, the process which comprises preparing at least two elements each comprising a fabric member treated on one face with an elastomer and on the other face with a thermosetting plastic, at least one of said elements having a projecting flap portion at an end thereof, assembling the elements in superposed relation to provide a tubular assembly with the thermosetting plastic coated faces in opposition and with said flap portion extending across an open end of the assembly, associating with the said flap an end-closure member comprising fabric treated on the face adjacent the flap with a material of the same character as that on the adjacent face of said flap, and consolidating the composite assembly by molding it under heat and pressure.

6. In the manufacture of a composite product, the process which comprises preparing at least two elements each comprising a fabric member treated on one face with an elastomer and on the other face with a thermosetting plastic, at least one of said elements having a projecting flap portion at an end thereof, assembling the elements in superposed relation to provide a tubular assembly with the thermosetting plastic coated faces in opposition and with said flap portion extending across an open end of the assembly, associating with the said flap a plurality of end-closure members disposed with at least one such member on either side of the flap, said closure members each comprising fabric treated on the face adjacent the flap with material of the same character as that on the adjacent face of said flap, and consolidating the composite assembly by molding it under heat and pressure.

7. In the manufacture of a composite product, the process which comprises preparing a tubular assembly comprising the following materials in the sequence recited: elastomer, fabric, thermosetting plastic, fabric, elastomer; at least one of the fabric members having an inwardly turned flap at an open end of the tubular assembly, said flap being treated on one face with a thermosetting plastic and on the other face with an elastomer, associating with the said flap a plurality of closure members disposed with at least one such member on either side of the flap, said closure members each comprising fabric coated on the face adjacent the flap with material of the same character as that on the adjacent face of said flap, and consolidating the composite assembly by molding it under heat and pressure.

8. In the manufacture of a composite product, the process which comprises preparing a tubular assembly comprising the following materials in the sequence recited: elastomer, fabric, thermosetting plastic, fabric, elastomer; at least one of the fabric members having an inwardly turned flap at an open end of the tubular assembly, said flap being treated on one face with a thermosetting plastic and on the other face with an elastomer, associating with the said flap a closure member covering the said open end of the tubular assembly and comprising fabric treated on the face adjacent the flap with a material of the same character as that on the adjacent face of said flap, and consolidating the composite assembly by molding it under heat and pressure.

9. In the manufacture of a composite product, the process which comprises treating one face of each of two fabric elements with thermosetting plastic, treating the other face of at least one of said fabric elements with an aqueous dispersion of an elastoplastic to produce thereon an elastoplastic deposit, superposing over said deposit a pre-formed sheet of solid elastoplastic, juxtaposing the two elements with their thermosetting plastic coated faces in opposition, and consolidating the assembly by molding it under heat and pressure.

10. The method of making a hollow article having sidewall and end closure portions formed of composite material, which comprises forming a sidewall portion by superposing two fabric elements with thermosetting plastic between them and an elastomer coating on at least one of the outer faces, providing an end closure member comprising a plurality of fabric elements in superposed relation with thermosetting plastic between two of the elements and an elastomer coating on at least one of the exposed faces, the sidewall portions and the end closure member having their fabric elements interlocked at least in part, and consolidating the assembly by molding it under heat and pressure.

11. A hollow container having sidewall and end closure portions comprising heat-molded composite material including at least two fabric elements in superposed relation with thermosetting plastic between them and elastoplastic coatings on both exposed faces thereof.

12. A hollow container having sidewall and end closure portions comprising heat-molded composite material including at least two fabric sheets in superposed relation with thermosetting plastic between them and elastoplastic on both exposed faces thereof, said elastoplastic comprising a plasticized polymer of a vinyl compound prepared by polymerizing material consisting predominantly of vinyl chloride.

WALTER R. HICKLER.

REFERENCES CITED

The following references are of record in the file of this patent:

UNITED STATES PATENTS

| Number | Name | Date |
| --- | --- | --- |
| 1,352,739 | Egerton | Sept. 14, 1920 |
| 1,776,879 | Baekeland | Sept. 30, 1930 |
| 1,919,697 | Groff | July 25, 1933 |
| 1,973,124 | Swan | Sept. 11, 1934 |
| 2,082,854 | Sutherland | June 8, 1937 |
| 2,118,549 | Cochrane | May 24, 1938 |
| 2,239,245 | Oliner | Apr. 22, 1941 |
| 2,243,736 | Loblein | May 27, 1941 |
| 2,263,661 | Walker | Nov. 25, 1941 |
| 2,343,095 | Smith | Feb. 29, 1944 |